(12) United States Patent
Qian et al.

(10) Patent No.: US 11,558,898 B2
(45) Date of Patent: Jan. 17, 2023

(54) RANDOM ACCESS METHOD, BASE STATION, USER EQUIPMENT AND DEVICE WITH STORAGE FUNCTION

(71) Applicant: HUIZHOU TCL MOBILE COMMUNICATION CO., LTD., Guangdong (CN)

(72) Inventors: Hua Qian, Guangdong (CN); Jianxin Jia, Guangdong (CN); Kai Kang, Guangdong (CN); Zhenghang Zhu, Guangdong (CN); Xuming Pei, Guangdong (CN); Zhenyu Tang, Guangdong (CN)

(73) Assignee: HUIZHOU TCL MOBILE COMMUNICATION CO., LTD., Guangdong (CN)

( * ) Notice: Subject to any disclaimer, the term of this patent is extended or adjusted under 35 U.S.C. 154(b) by 38 days.

(21) Appl. No.: 17/254,780

(22) PCT Filed: Oct. 19, 2018

(86) PCT No.: PCT/CN2018/111047
§ 371 (c)(1),
(2) Date: Dec. 21, 2020

(87) PCT Pub. No.: WO2020/000791
PCT Pub. Date: Jan. 2, 2020

(65) Prior Publication Data
US 2021/0274547 A1 Sep. 2, 2021

(30) Foreign Application Priority Data

Jun. 27, 2018 (CN) .......................... 201810682487.4

(51) Int. Cl.
*H04W 74/00* (2009.01)
*H04W 76/11* (2018.01)
(Continued)

(52) U.S. Cl.
CPC ..... *H04W 74/008* (2013.01); *H04W 72/0413* (2013.01); *H04W 72/0453* (2013.01);
(Continued)

(58) Field of Classification Search
None
See application file for complete search history.

(56) References Cited

U.S. PATENT DOCUMENTS 10,868,640 B2 12/2020 Cao
2009/0259910 A1 10/2009 Lee
(Continued)

FOREIGN PATENT DOCUMENTS

CN 102158981 A 8/2011
WO 2017166373 A1 10/2017
WO 2018054163 A1 3/2018

OTHER PUBLICATIONS

Ericsson, "Random access for NB-IOT", dated Jan. 2016, 3GPP TSG-RAN WG2 Meeting NB-IOT ad-hoc, R2-160470, all pages (Year: 2016).*
(Continued)

*Primary Examiner* — Gregory B Sefcheck
*Assistant Examiner* — Srinivasa R Reddivalam
(74) *Attorney, Agent, or Firm* — Hamre, Schumann, Mueller & Larson, P.C.

(57) ABSTRACT

A random access method, a base station, an UE and a device with a storage function are disclosed. The random access method includes: the base station receiving a first message transmitted by the UE, the first message including a preamble message and a signal message; decoding the preamble message and the signal message respectively; if the decoding of preamble message is succeeded, but the decoding of signal message fails, the base station transmits a second message to the UE, and storing the signal message of decoding failure, the second message configured to request the UE to retransmit the signal message; receiving the third message transmitted by the UE, the third message including the signal message; using a chase combine mechanism to decode the third message according to the stored signal
(Continued)

message in the first message. The present disclosure save time and improve the efficiency of random access.

18 Claims, 5 Drawing Sheets

(51) Int. Cl.
   *H04W 72/04* (2009.01)
   *H04W 74/08* (2009.01)
(52) U.S. Cl.
   CPC ... *H04W 74/0816* (2013.01); *H04W 74/0841* (2013.01); *H04W 76/11* (2018.02)

(56) References Cited

U.S. PATENT DOCUMENTS

| | | | | |
|---|---|---|---|---|
| 2016/0192420 | A1* | 6/2016 | Kim | H04W 4/06 370/329 |
| 2016/0381711 | A1 | 12/2016 | Kim | |
| 2019/0350000 | A1* | 11/2019 | Zhang | H04W 74/08 |
| 2020/0196354 | A1* | 6/2020 | Li | H04W 74/08 |
| 2021/0298045 | A1* | 9/2021 | Kim | H04W 16/14 |

OTHER PUBLICATIONS

The Extended European search report issued in European Application No. 18924980.8, dated Mar. 24, 2022.

Ericsson: "Random access for NB-IOT", 3GPP Draft; R2-160470—Random Access for NB-IOT, 3rd Generation Partnership Project (3GPP), Mobile Competence Centre; 650, Route Des Lucioles; F-06921 Sophia-Antipolis Cedex; France, vol. RAN WG2, No. Budapest, HU; Jan. 19, 2016-Jan. 21, 2016, Jan. 18, 2016.

Nokia Siemens Networks et al: "Gaps for IDC Problems", 3GPP Draft; R2-122111 Gaps for IDC, 3rd Generation Partnership Project (3GPP), Mobile Competance Centre; 650, Route Des Lucioles; F-06921 Sophia-Antipolis Cedex; France, vol. RAN WG2, No. Prague, Czech Republic; May 21, 2012-May 25, 2012, May 15, 2012.

* cited by examiner

RANDOM ACCESS METHOD, BASE STATION, USER EQUIPMENT AND DEVICE WITH STORAGE FUNCTION

CROSS REFERENCE

This application is a US national phase application based upon an International Application No. PCT/CN2018/111047, filed on 2018 Oct. 19, which claims the priority of Chinese Patent Application No. 201810682487.4, entitled "RANDOM ACCESS METHOD, BASE STATION, USER EQUIPMENT AND DEVICE WITH STORAGE FUNCTION", filed on 2018 Jun. 27, the disclosure of which is incorporated herein by reference in its entirety.

TECHNICAL FIELD

Embodiments of the present disclosure generally relate to the field of communications, and in particular, to a random access method, a base station, an user equipment (UE), and a device with a storage function.

BACKGROUND

In current radio communication technologies, the shortage of frequency bands has become increasingly serious, and the communication method in an unlicensed frequency band can be adopted to broaden the available frequency bands to solve the problem. In a mobile communication system based on a long term evolution (LTE) network, license assisted access (LAA) technology is adopted to use an unlicensed frequency band with the assistance of a licensed frequency band.

In an NR-U (New Radio in Unlicensed Spectrum) scenario, a terminal needs to perform a random access procedure in an unlicensed frequency band. As in the unlicensed frequency band, it is needed to acquire the channel through the listen before talk (LBT) mechanism during each message transmission, which may greatly reduce the efficiency of the random access procedure. In order to reduce the number of LBTs in the NR-U scenario and shorten the waiting time, the existing 4-step random access method is simplified into two steps, and the user transmits the preamble message together with the signal message to the base station. Compared to the preamble message, the decoding success rate of the signal message is lower, thus easily causing the problem of decoding failure. In this case, the base station requests the user to retransmit the signal message and decode the newly received signal message, which wastes the previous decoding result of the signal message, and with the retransmission of the signal message, the decoding success rate of the signal message is not significantly improved, and the efficiency of random access is reduced.

SUMMARY

The technical problem to be solved by the present disclosure is to provide a random access method, which can save time and improve the efficiency of random access procedure in NR-U.

To solve the above technical problem, a technical solution adopted by the present disclosure is to provide a random access method, including: receiving, by a base station, a first message transmitted by an UE, the first message including a preamble message and a signal message; separately decoding the preamble message and the signal message; if the decoding of the preamble message is succeeded, while the decoding of the signal message fails, transmitting a second message to the UE, and storing the signal message that the decoding fails, the second message configured to notify the UE to retransmit the signal message; receiving a third message transmitted by the UE, the third message including the signal message; and using a chase combine mechanism to decode the third message, in conjunction with the stored signal message in the first message.

To solve the above technical problem, another technical solution adopted by the present disclosure is to provide a random access method, including: transmitting, by an UE, a first message to a base station, the first message including a preamble message and a signal message; receiving a second message, and according to the indication of the second message, transmitting, a third message to the base station, the third message including the signal message; and receiving a fourth message transmitted by the base station, and performing random access communication with the base station.

In order to solve the above technical problem, another technical solution adopted by the present disclosure is to provide a base station, including: a processor, a communication circuit, and a storage, wherein the processor is connected to the communication circuit and the storage, the storage is stored with program instructions, the processor executes the program instructions to implement the method as described above by the communication circuit.

In order to solve the above technical problem, another technical solution adopted by the present disclosure is to provide an UE, including: a processor, a communication circuit, and a storage, the processor connected to the communication circuit and the storage, the storage stored with program instructions, and the processor executing the program instructions, to implement the method as described above by the communication circuit.

In order to solve the above technical problem, another technical solution adopted by the present disclosure is to provide a device with a storage function, the program instructions are configured to be executed to implement the method as described above.

The invention has the beneficial effects that, different from the prior art, the present disclosure can save the time required for retransmitting the signal message by storing the signal message of the decoding failure, thereby improving the efficiency of the random access.

DETAILED DESCRIPTION

The technical schemes in the embodiments of the present disclosure will now be clearly and completely described in conjunction with the accompanying drawings in the embodiments of the present disclosure, and it will be apparent that the described embodiments are merely a part of the embodiments of the disclosure, instead of all embodiments. All other embodiments obtained based on the embodiments in the present disclosure by those of ordinary skill in the art without making creative work should fall into the scope of the present disclosure.

Figure 1:
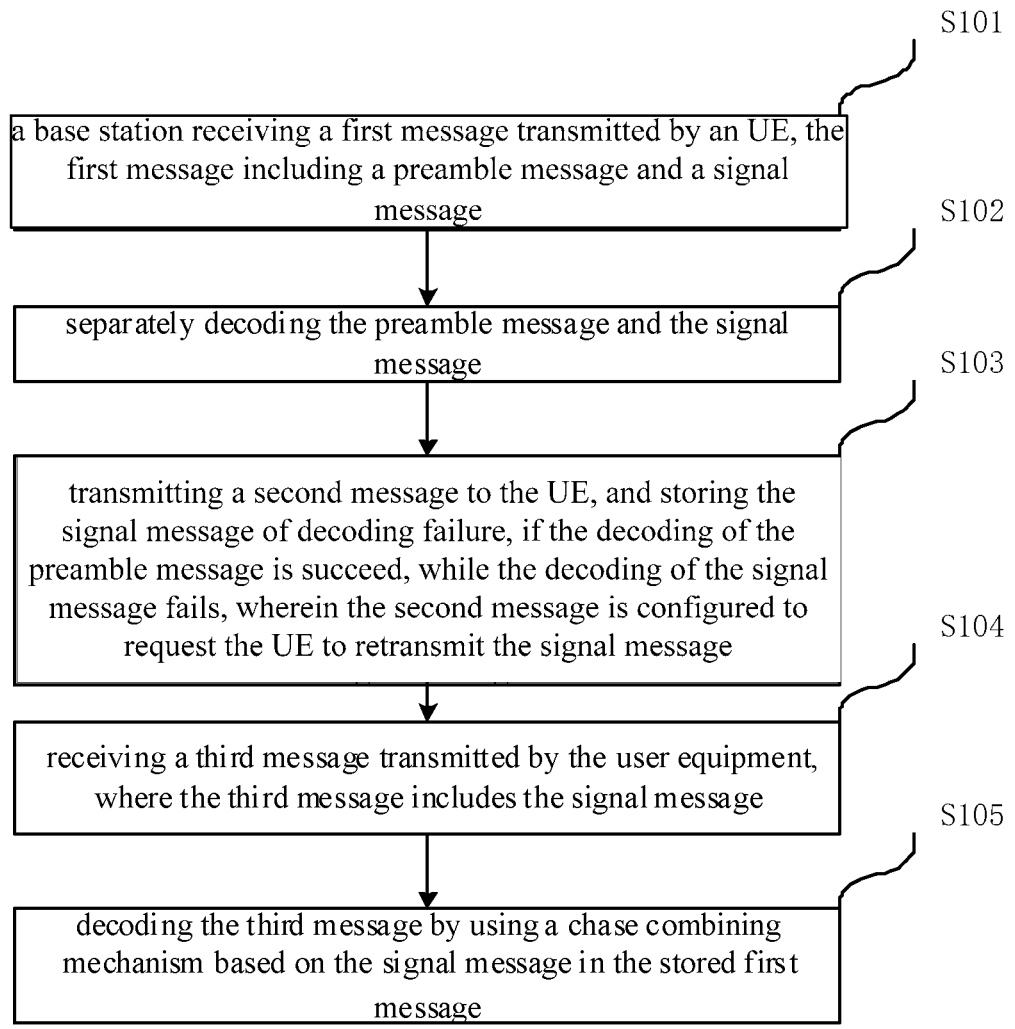
FIG. 1 is a schematic flowchart diagram of a first embodiment of a random access method provided by the present disclosure.

Referring to FIG. 1, FIG. 1 is a schematic flowchart diagram of a first embodiment of a random access method according to the present disclosure. As shown in FIG. 1, the random access method provided by the present disclosure includes following steps.

In step S101, the method includes a base station receiving a first message transmitted by an UE, the first message including a preamble message and a signal message.

In a specific implementation scenario, both the base station and the UE operate in the NR-U network. When the licensed frequency bands cannot meet the current communication requirements, the UE needs to complete the random access procedure in the NR-based unlicensed frequency band to meet the communication requirements. The UE may transmit a first message to the base station to request for establishing a random access in an unlicensed frequency band. The base station receives the first message transmitted by the UE, the first message including a preamble message and a signal message. The preamble message includes a set of preamble sequences selected out of contention preambles, and the signal message includes at least one of a radio resource control connection request and a schedule request, as well as a cell radio network temporary identity.

The scenario of accessing the NR-based unlicensed frequency band in the present implementation scenario includes following cases.

A scenario of a carrier aggregation between an NR cell of a licensed frequency band (primary cell) and an NR cell of an unlicensed frequency band (secondary cell) may be included, where the NR cell of an unlicensed frequency band (secondary cell) may include both uplink and downlink, or may only include the downlink.

A scenario of a dual connectivity between an LTE cell of a licensed frequency band (primary cell) and an NR cell of an unlicensed frequency band (secondary cell) may be included.

A scenario of a stand-alone NR cell of unlicensed frequency band may be included.

A scenario of an NR cell with a downlink in an unlicensed frequency band and an uplink in a licensed frequency band may be included.

A scenario of a dual connectivity between an NR cell of a licensed frequency band (primary cell) and an NR cell of an unlicensed frequency band (secondary cell) may also be included.

In the present implementation scenario, both the UE and the base station operate in an unlicensed frequency band.

In step S102, the method includes separately decoding the preamble message and the signal message.

In the present implementation scenario, the base station separately decodes the preamble message and the signal message in the received first message. The order of decoding can be simultaneous, or sequential. For example, the preamble message may be decoded first, then the signal message may be decoded, or the signal message may be decoded first, then the preamble message may be decoded. When the decoding of the message to be decoded first fails, the decoding process of the follow-up message to be decoded will not be affected.

In step S103, the method includes transmitting a second message to the UE, and storing the signal message of decoding failure, if the decoding of the preamble message is succeed, while the decoding of the signal message fails, wherein the second message is configured to request the UE to retransmit the signal message.

The preamble message is simpler than the signal message, and the decoding difficulty is lower, so the decoding success rate is high. In the present implementation scenario, the base station decodes the preamble message successfully but the decoding of the signal message fails, and the base station transmits a second message to the UE to request the UE to retransmit the signal message for decoding, and the base station stores the signal message of the decoding failure to aid in the subsequent decoding of the newly received signal message. In the present implementation scenario, the second message includes at least one of time adjustment information, a cell radio network temporary identity, and an uplink resource allocation. Herein, the time adjustment information is a time adjustment information adjusted based on an estimated delay between the base station and the UE, after the base station receives the first message.

In step S104, the method includes receiving a third message transmitted by the UE, where the third message includes the signal message.

In the present implementation scenario, the current channel communication condition is good, and the second message transmitted by the base station is successfully received by the UE, and the UE transmits a third message including the signal message to the base station in response to the second message. The base station successfully receives the third message and obtains the signal message included in the third message. In other implementation scenarios, when the current communication condition is not good, the base station cannot find a suitable channel to transmit the second message, and after a specified time, the UE still has not received the second message, or after the specified time, the base station cannot receive the third message transmitted by the UE, then the UE may determine that the random access fails. In this case, the process returns to perform steps S101-S104.

In step S105, the method includes decoding the third message by using a chase combine mechanism based on the stored signal message in the first message.

In the present embodiment, the chase combine mechanism is configured to decode the received third message including the signal message in conjunction with the stored signal message of the decoding failure in the first message. The signal message in the first message that fails to be decoded and the signal message in the newly received third message may be combined according to a certain ratio. Since a part of the signal message in the first message that fails to get decoded has already been decoded, the signal message obtained after combining may also have at least a part of decoded content, and the decoding success rate can be effectively improved when decoding the combined signal message.

In other implementation scenarios, the method of corresponding location replacement may also be used to replace the decoded portion of the signal message in the first message that fails to be decoded with the corresponding portion of the signal message in the newly received third message, so that when the signal message in the third message is decoded, only the portion not replaced needs to be decoded, which can effectively improve the success rate of decoding.

In the present implementation scenario, after the base station adopts the chase combine mechanism to successfully decode the signal message and obtain the content included in the signal message, the base station transmits a fourth message to the UE to notify the UE that the random access is succeeded. In the present implementation scenario, the base station may simultaneously receive multiple UE transmitting signal messages with the same preamble sequence, and the base station selects one UE from the multiple UE, and transmits a fourth message to the UE, to notify the UE that the random access is succeeded, and the communication can be performed in an unlicensed frequency band. In the present implementation scenario, the fourth message includes a contention resolution, such as an identity of the selected UE or an identity of the contention resolution.

In another implementation scenario, when the decoding of the signal message in the third message fails, the step of transmitting the second message to the UE in step S103 is repeatedly performed to step S105 until the decoding is succeeded.

According to the above description, in the present embodiment, during the random access procedure, when the decoding signal message fails, the signal message of the decoding failure is stored and the UE is requested to retransmit the signal message, and the newly received signal is tracked in conjunction with the signal message of the decoding failure, so as to improve the decoding success rate, thereby improving the efficiency of random access.

Figure 2:
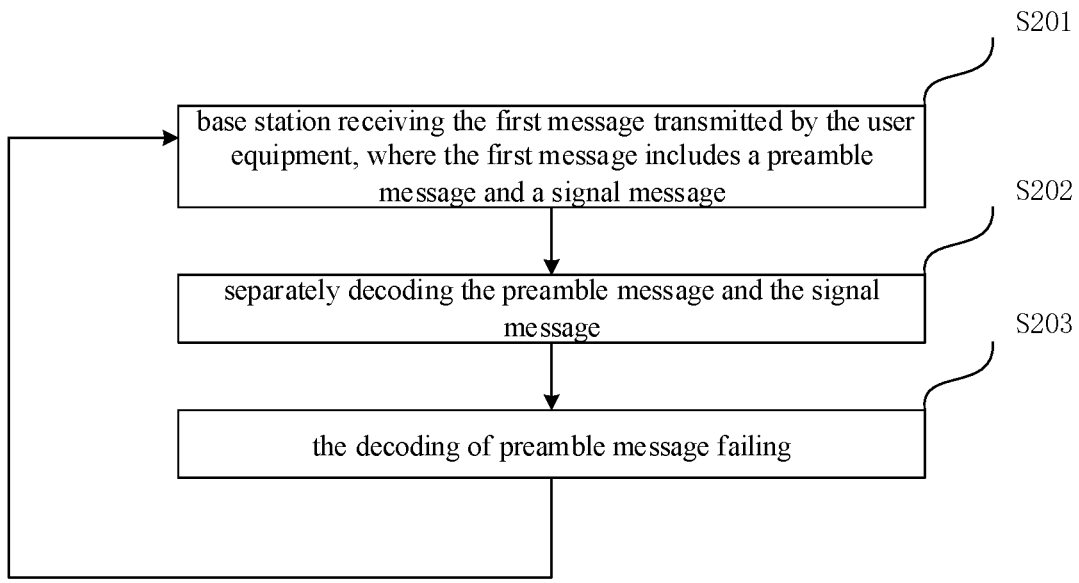
FIG. 2 is a schematic flowchart diagram of a second embodiment of a random access method provided by the present disclosure.

Referring to FIG. 2, FIG. 2 is a schematic flowchart diagram of a second embodiment of a random access method according to the present disclosure. As shown in FIG. 2, the random access method provided by the present disclosure includes following steps.

In step S201, the method includes that the base station receives the first message transmitted by the UE, where the first message includes a preamble message and a signal message.

In step S202, the method includes separately decoding the preamble message and the signal message.

The steps S201-S202 are basically the same with the steps S101-S102 of the first embodiment of the random access provided by the present disclosure, and are not described herein again.

In step S203, the method includes returning to step S201-S202, if the decoding of preamble message fails.

In the present implementation scenario, the base station decodes the preamble message in the received first message, as the preamble message is configured to indicate the existence of the random access request of the UE to the base station, and allow the base station to estimate a delay between the base station and the UE, therefore, when the decoding of the preamble fails, the base station will not be able to transmit a response message (for example, a second message and/or a fourth message) corresponding to the first message to the UE.

When the UE does not receive the response message (for example, the second message and/or the fourth message) transmitted by the base station within a preset time, the first message is retransmitted to the base station. Therefore, when the base station fails to decode the preamble message, it is only needed to wait for the UE to retransmit the first message, and then the method goes to perform steps S201-S202.

In the present implementation scenario, both the UE and the base station operate in an unlicensed frequency band.

According to the above description, in the present implementation, when the preamble message fails to be decoded, the method goes to directly wait for the UE to retransmit a new first message.

Figure 3:
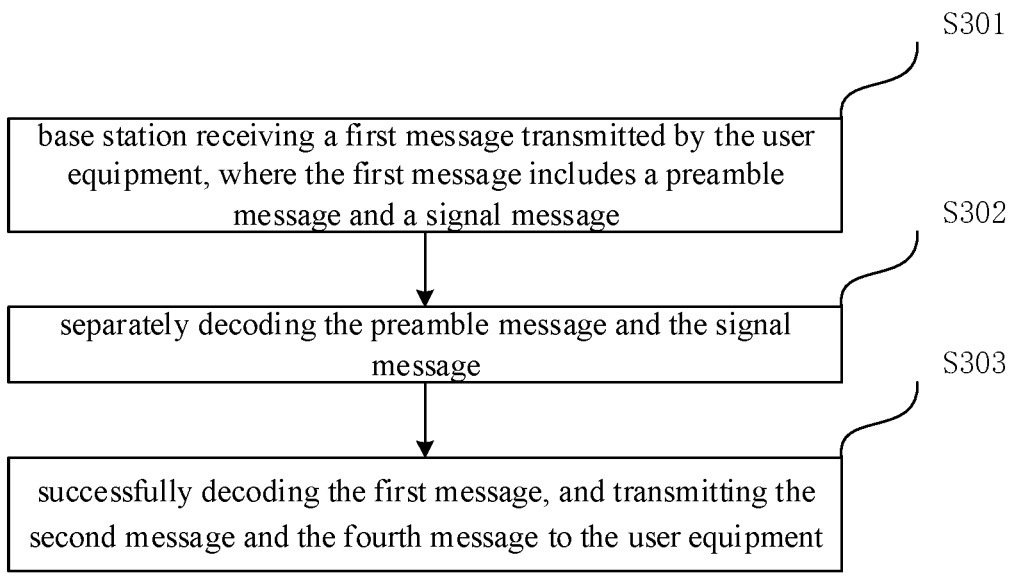
FIG. 3 is a schematic flowchart diagram of a third embodiment of a random access method provided by the present disclosure.

Referring to FIG. 3, FIG. 3 is a schematic flowchart diagram of a third embodiment of a random access method according to the present disclosure. As shown in FIG. 3, the random access method provided by the present disclosure includes following steps.

In step S301, the method includes that the base station receives a first message transmitted by the UE, where the first message includes a preamble message and a signal message.

In step S302, the method includes separately decoding the preamble message and the signal message.

The steps S301-S302 are basically the same with the steps S101-S102 of the first embodiment of the random access provided by the present disclosure, and are not described herein again.

In step S303, the method includes successfully decoding the first message, and transmitting the second message and the fourth message to the UE.

In the present implementation scenario, when the base station successfully decodes the first message, the second message and the fourth message are transmitted to the user.

In the present implementation scenario, the second message includes at least one of time adjustment information, a cell radio network temporary identity, and an uplink resource allocation. The fourth message includes a contention resolution, such as an identity of the selected UE or an identity of the contention resolution, to notify the UE that the random access is succeeded and the communication may be performed in an unlicensed frequency band.

In the present implementation scenario, both the UE and the base station operate in an unlicensed frequency band.

According to the above description, the preamble message and the signal message are included in the first message and transmitted to the base station at one time. After successfully decoding the first message, the base station transmits the second message and the fourth message at one time, which can effectively save the time required for random access, thereby improving the efficiency of random access.

Figure 4:
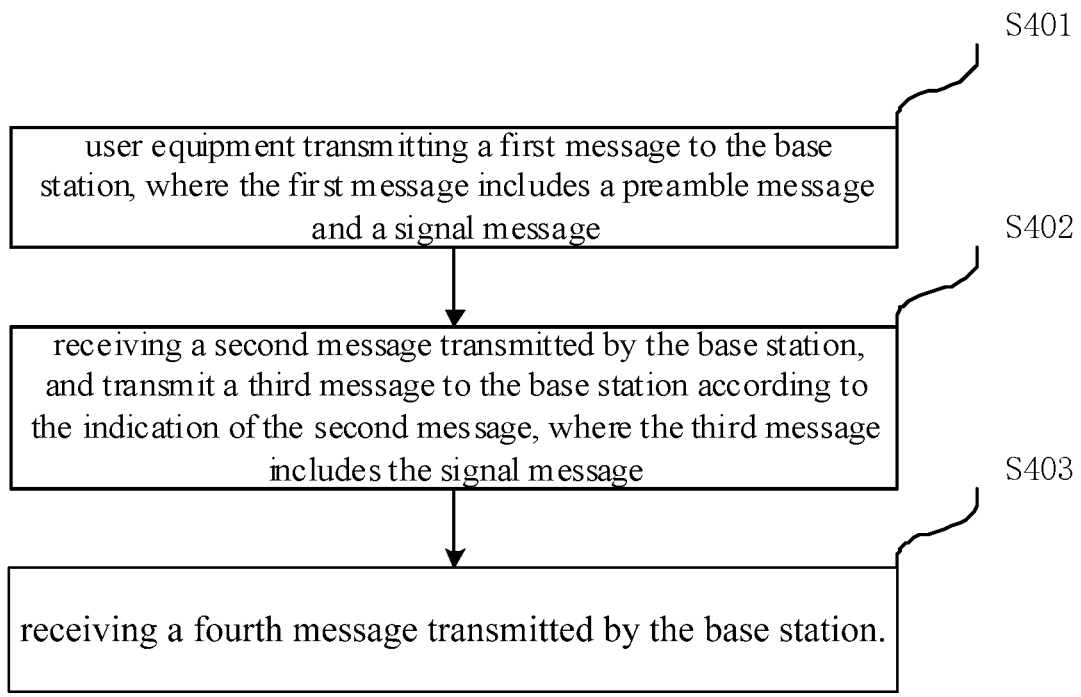
FIG. 4 is a schematic flowchart diagram of a fourth embodiment of a random access method provided by the present disclosure.

Referring to FIG. 4, FIG. 4 is a schematic flowchart diagram of a fourth embodiment of a random access method according to the present disclosure. As shown in FIG. 4, the random access method provided by the present disclosure includes following steps.

In step S401, the method includes that the UE transmits a first message to the base station, the first message including a preamble message and a signal message.

In a specific implementation scenario, both the base station and the UE both operate in the NR-U network. When the licensed frequency band cannot meet the current communication requirements, the UE needs to complete the random access procedure on the unlicensed frequency band to meet the communication requirement. The UE transmits a first message to the base station to request for establishing a random access of an unlicensed frequency band. In the present implementation scenario, before the first message is transmitted to the base station, the UE performs a listen before talk (LBT) mechanism to determine whether the current channel is available, and only if the current channel is available, the first message is transmitted to the base station.

In the present implementation scenario, the first message includes a preamble message and a signal message. The preamble message requires a determined transmission power and transmission format to be transmitted to the base station at a selected timing. In the present implementation scenario, the transmission format may be determined based on broadcast system information, the transmission power may be estimated based on downlink path loss in the downlink reference signal or control signal, and the timing of transmission is randomly selected. In the present implementation scenario, the preamble message includes a set of preamble sequences selected from the contention preamble. The difficulty of decoding the preamble sequence is relatively low, so that the base station can quickly decode the preamble after receiving the preamble, and obtain the information contained in the preamble.

The accessing scenario of the NR-based unlicensed frequency band referred in the present implementation scenario includes following cases.

A scenario of a carrier aggregation between an NR cell of a licensed frequency band (primary cell) and an NR cell of an unlicensed frequency band (secondary cell) may be included, where the NR cell of an unlicensed frequency band (secondary cell) may include both uplink and downlink, or may only include the downlink.

A scenario of a dual connectivity between an LTE cell of a licensed frequency band (primary cell) and an NR cell of an unlicensed frequency band (secondary cell) may be included.

A scenario of a stand-alone NR cell of unlicensed frequency band may be included.

A scenario of an NR cell with a downlink in an unlicensed frequency band and an uplink in a licensed frequency band may be included.

A scenario of a dual connectivity between an NR cell of a licensed frequency band (primary cell) and an NR cell of an unlicensed frequency band (secondary cell) may also be included.

In the present implementation scenario, both the UE and the base station operate in an unlicensed frequency band.

In step S402, the method includes receiving a second message transmitted by the base station, and transmitting a third message to the base station according to the indication of the second message, wherein the third message includes the signal message.

In the present implementation scenario, the base station successfully receives the first message, and separately decodes the preamble message and the signal message included in the first message. When the base station decodes the preamble message successfully and the decoding of the signal message fails, the base station transmits the second message to the UE, to request the UE to retransmit a signal message. In the present implementation scenario, the second message includes at least one of time adjustment information, a cell radio network temporary identity, and an uplink resource allocation.

After receiving the second message transmitted by the base station, the UE transmits a third message to the base station in response to the second message, where the third message includes a signal message. The base station can decode the signal message in the newly received third message in conjunction with the stored signal message of decoding failure, so as to use the part of the content that has been decoded in the signal message that previously fails to be decoded, thus saving resources and time, and improving decoding success rate and efficiency, thereby improving the efficiency of random access.

In another implementation scenario, after the base station receiving the third message, if the decoding of the third message (signal message) also fails, and then the base station retransmit the second message to the UE. The user message will continue to respond to the second message, to transmit a third message to the base station until the base station decodes the third message successfully.

In step S403, the method including receiving a fourth message transmitted by the base station.

In the present implementation scenario, the base station successfully decodes the third message, and transmits a fourth message to the UE to notify the UE that the random access is successful, and the communication may be performed in the unlicensed frequency band. In the present implementation scenario, the fourth message includes a contention resolution, such as an identity of the selected UE or an identity of the contention resolution.

In another implementation scenario, the current channel is busy, and when the base station fails to decode the third message, the base station cannot obtain a transmission opportunity by using the LBT to transmit the second message to the UE, or after the base station succeeds in decoding the third message, the base station cannot obtain a transmission opportunity by using the LBT to transmit the fourth message. In order to avoid wasting time for the UE to keep waiting for receiving the message, a preset waiting time is configured. If the fourth message or the second message transmitted by the base station is not received within the preset waiting time, the first message is retransmitted to the base station, and steps S401-S403 are re-executed.

According to the foregoing description, in the embodiment, by transmitting the preamble message and the information message to the base station at one time, the time required for transmitting the message can be saved, and the base station can store the signal message of decoding failure when the signal message fails to be decoded, and transmit a second message to the UE to request the UE to transmit the third message including the signal message, and decode the third message by using a chase combine mechanism, thus improving the success rate of the decoding, further improving the efficiency of the random access.

Figure 5:
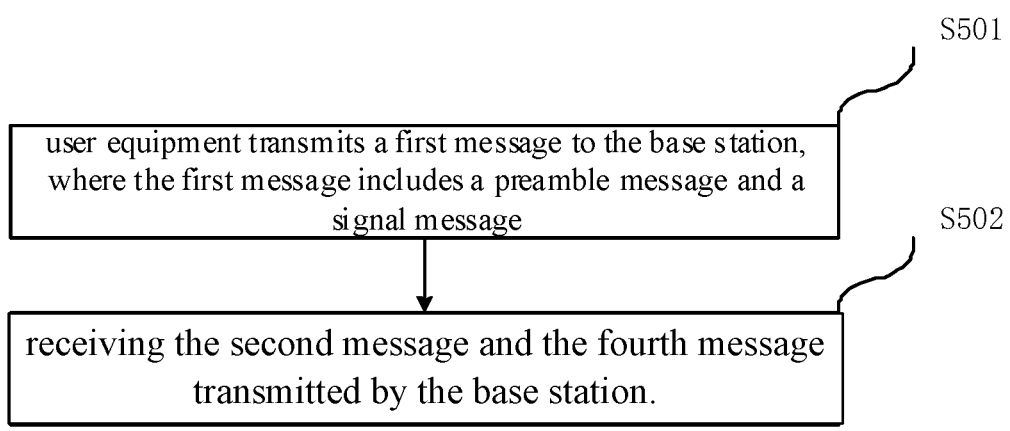
FIG. 5 is a schematic flowchart diagram of a fifth embodiment of a random access method according to the present disclosure.

Referring to FIG. 5, FIG. 5 is a schematic flowchart diagram of a fifth embodiment of a random access method according to the present disclosure. As shown in FIG. 5, the random access method provided by the present disclosure includes following steps.

In step S501, the method includes that the UE transmits a first message to the base station, the first message including a preamble message and a signal message.

The step S501 is basically the same with the step S401 of the fourth embodiment of the random access provided by the present disclosure, and details are not described herein again.

In step S502, the method includes receiving the second message and the fourth message transmitted by the base station.

In the present implementation scenario, in the implementation scenario, when the base station successfully decodes the first message, the second message and the fourth message are transmitted to the user at one time. In the present implementation scenario, the second message includes at least one of time adjustment information, a cell radio network temporary identity, and an uplink resource allocation, the forth message including a contention resolution, such as an identity of the selected UE or an identity of the contention resolution. After the UE receiving the second message and the fourth message, it is considered that the random access is succeeded, and communication may be performed in an unlicensed frequency band.

In the present implementation scenario, both the UE and the base station operate in an unlicensed frequency band.

According to the above description, that the preamble message and the signal message are included in the first message and transmitted to the base station at one time. After successfully decoding the first message, the base station transmits the second message and the fourth message to the UE at one time. The UE considers that the random access is succeeded and communication may be performed in an unlicensed frequency band. It can reduce the time to transmit each message and improve the efficiency of random access.

Figure 6:
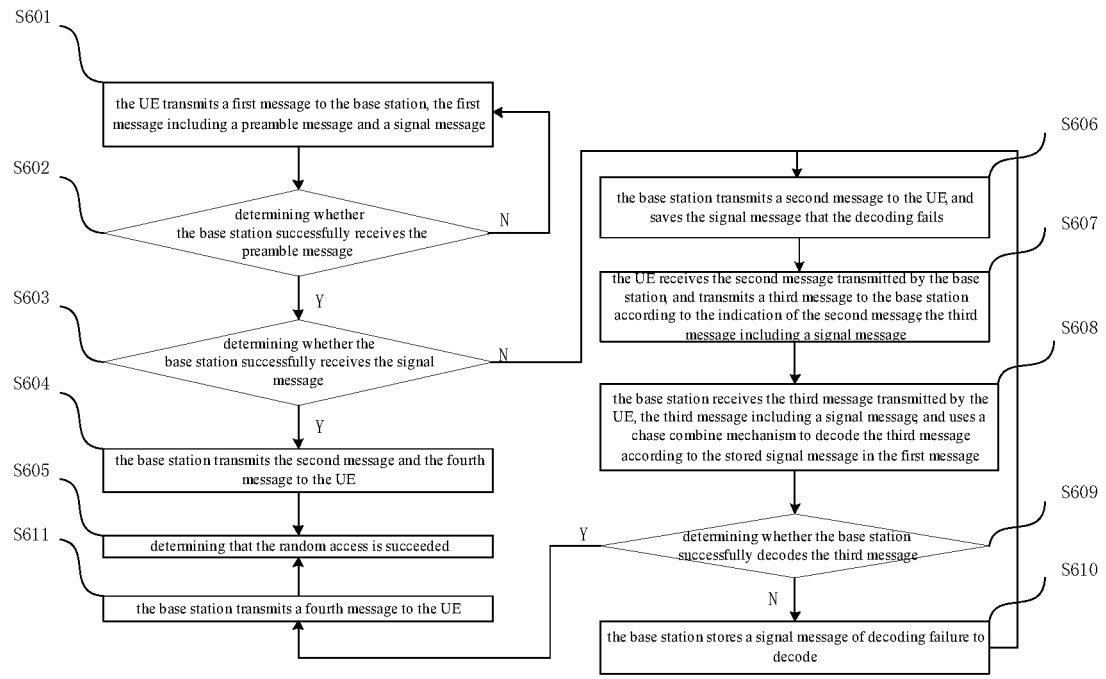
FIG. 6 is a schematic flowchart diagram of a sixth embodiment of a random access method provided by the present disclosure.

Referring to FIG. 6, FIG. 6 is a schematic flowchart diagram of a fifth embodiment of a random access method according to the present disclosure. As shown in FIG. 6, the random access method provided by the present disclosure includes following steps.

In step S601, the method includes that the UE transmits a first message to the base station, the first message including a preamble message and a signal message.

In step S602, the method including determining whether the base station successfully receives the preamble message.

If the base station successfully receives the preamble message, the method proceeds to step S603, and if the base station does not successfully receive the preamble message, the method returns to step S601.

In step S603, the method includes determining whether the base station successfully receives the signal message.

If the base station successfully receives the signal message, the method proceeds to step S604, and if the base station does not successfully receive the signal message, step S606 is executed.

In step S604, the method includes that the base station transmits the second message and the fourth message to the UE.

In step S605, the method includes determining that the random access is succeeded.

In step S606, the method includes that the base station transmits a second message to the UE, and saves the signal message that the decoding fails.

In step S607, the method includes that the UE receives the second message transmitted by the base station, and transmits a third message to the base station according to the indication of the second message, the third message including a signal message.

In step S608, the method includes that the base station receives the third message transmitted by the UE, the third message including a signal message, and uses a chase combine mechanism to decode the third message according to the stored signal message in the first message.

In step S609, the method includes determining whether the base station successfully decodes the third message.

If the base station successfully decodes the third message, the method proceeds to step S611, and if the base station does not successfully decode the third message, step S610 is executed.

In step S610, the method includes that the base station stores a signal message of decoding failure to decode.

In step S611, the method includes that the base station transmits a fourth message to the UE.

According to the above description, that the preamble message and the signal message are included in the first message and transmitted to the base station at one time. After successfully decoding the first message, the base station transmits the second message and the fourth message to the UE at one time. The UE considers that the random access is succeeded and communication may be performed in an unlicensed frequency band, which can reduce the time for transmitting each message. After the base station fails to decode the signal message, the base station stores the signal message of decoding failure, and transmits a second message to the UE to request the UE to transmit the third message including the signal message, and the third message is decoded by using a chase combine mechanism, which can improve the success rate of decoding and improve the efficiency of random access.

Figure 7:
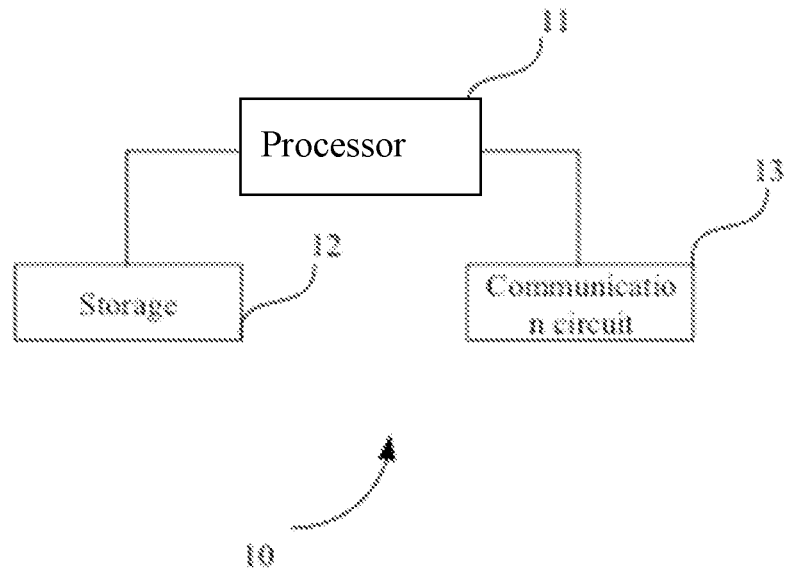
FIG. 7 is a schematic diagram of an embodiment of a base station provided by the present disclosure.

Please refer to FIG. 7. FIG. 7 is a schematic structural diagram of an embodiment of a base station provided by the present disclosure. The base station 10 includes a processor 11, a storage 12 configured to store program data, and a communication circuit 13 configured to operate program data in the storage 12 to control the communication circuit 13 to communicate and perform random access method as follows.

The processor 11 of the base station 10 controls the communication circuit 13 to receive the first message transmitted by the UE, the first message including the preamble message and the signal message; the processor 11 separately decodes the preamble message and the signal message; if the processor 11 decodes the preamble message successfully, but fails to decode the signal message, the processor 11 transmits a second message to the UE through the communication circuit 13, and saves the signal message of the decoding failure in the storage 12, and the second message is configured to request the UE to retransmit the signal message; the processor 11 controls the communication circuit 13 to receive the third message transmitted by the UE, and the third message includes the signal message; the processor 11 decodes the third message by using the chase combine mechanism in conjunction with the stored signal message in the first message.

In the present implementation scenario, both the UE and the base station operate in an unlicensed frequency band.

According to the above description, in the embodiment, when the signal message fails to be decoded in the random access process, the base station stores the signal message of the decoding failure and requests the UE to retransmit the signal message, and tracks and decodes the newly received signal message in conjunction with the signal message of the decoding failure, which can improve the decoding success rate, thereby improving the efficiency of random access.

Figure 8:
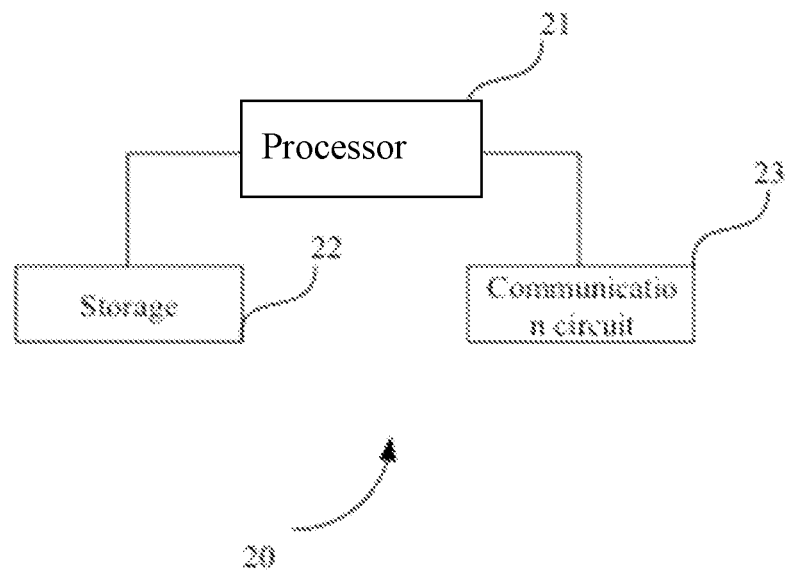
FIG. 8 is a schematic diagram of the structure of an UE of an embodiment provided by the present disclosure.

Please refer to FIG. 8. FIG. 8 is a schematic structural diagram of an embodiment of a UE provided by the present disclosure. The UE 20 includes a processor 21, a storage 22 configured to store program data, and a communication circuit 23 configured to operate program data in the storage 22 to control the communication circuit 13 to communicate and perform random access method as follows.

The processor 21 of the UE 20 transmits a first message to the base station through the communication circuit 23, the first message including a preamble message and a signal message; the processor 21 receives the second message transmitted by the base station through the communication circuit 23, and the processor 21 transmits a third message to the base station through the communication circuit 23 according to the indication of the second message, the third message including the signal message. The processor 21 receives the fourth message transmitted by the base station through the communication circuit 23, and performs random access communication with the base station.

In the present implementation scenario, both the UE and the base station operate in an unlicensed frequency band.

According to the foregoing description, in the embodiment, the UE can save the time required for transmitting the message by transmitting the preamble message and the information message to the base station at one time. When the signal message fails to be decoded, the base station can store the signal message of the decoding failure and transmit the second message to the UE to request the UE to transmit the third message including the signal message, and the third message may be decoded by using a chase combine mechanism, which may improve the success rate of the decoding, thereby improving the efficiency of the random access.

Figure 9:
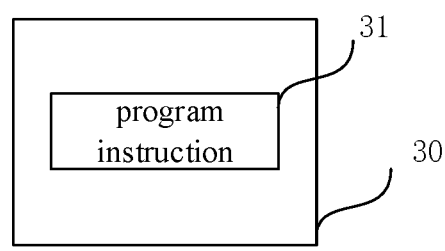
FIG. 9 is a schematic diagram of the structure of a device with storage function provided by the present disclosure.

Please refer to FIG. 9. FIG. 9 is a schematic structural diagram of an embodiment of a device with a storage function provided by the present disclosure. The device 30 with the storage function stores at least one program instruction 31 configured to execute the random access method as shown in FIG. 1-FIG. 6. In one embodiment, the device with the storage function may be a storage chip in a terminal, a hard disk, a removable hard disk, or other readable, writeable, and storable device such as a USB flash drive and an optical disk, and may also be a server or the like.

As described above, in this embodiment, the program or the instruction stored in the device with the storage function in this embodiment may be used to transmit the preamble message and the signal message to the base station in the first message at one time, after the base station succeeds in decoding the first message, the second message and the fourth message are transmitted to the UE at one time, and then the UE considers that the random access is succeeded, and communication may be performed in the unlicensed frequency band, which can reduce the time required for transmitting each message. After the base station fails to decode the signal message, the base station stores the signal message of the decoding failure, and transmits a second message to the UE to request the UE to transmit the third message including the signal message, and the third message is decoded by using a chase combine mechanism, which can improve the success rate of decoding, thus improving the efficiency of random access.

Different from the prior art that when the first message fails to be decoded, only the signal message that is retransmitted by the UE is directly re-decoded, which involves a low success rate, in the present disclosure, after the signal message fails to be decoded, the signal message of the decoding failure is stored, and a second message is transmitted to the UE to request the UE to transmit the third message including the signal message, and the third message is decoded in conjunction with the signal message of decoding failure by using a chase combine mechanism, in which case, the decoded content in the signal message that fails to be decoded can be effectively utilized, thus improving the success rate of decoding, further improving the efficiency of random access.

The above description merely illustrates some exemplary embodiments of the disclosure, which however are not intended to limit the scope of the disclosure to these specific embodiments. Any equivalent structural or flow modifications or transformations made to the disclosure, or any direct or indirect applications of the disclosure on any other related fields, shall all fall in the scope of the disclosure.

What is claimed is:

1. A random access method for communication between a user equipment (UE) and a base station, comprising:
   receiving a first message transmitted from the UE, wherein the first message includes a preamble message and a signal message;
   decoding the preamble message and the signal message from the first message transmitted from the UE;
   transmitting, upon successfully decoding the first message, a second message and a fourth message at a time to the UE to notify the UE that random access for the UE is successful;
   when the preamble message is successfully decoded while decoding of the signal message is failed, the base station storing the signal message, and transmitting the second message configured to request the UE to transmit a third message comprising the signal message;
   upon reception of the third message transmitted in response to the second message, the base station decoding the signal message from the third message in conjunction with the stored signal message based on a chase combine mechanism; and
   when both the preamble message and the signal message are successfully decoded, transmitting the fourth message configured to indicate that random access for the UE is successful;
   wherein the base station and the UE operate in an unlicensed frequency band;
   the second message comprises at least one of a time adjustment information, a cell radio network temporary identity, and an uplink resource allocation; and
   the fourth message comprises a contention resolution.

2. The random access method as claimed in claim 1, wherein the random access is a random access according to New Radio in Unlicensed Spectrum (NR-U).

3. The random access method as claimed in claim 1, further comprising:
   when decoding of the signal message from the third message is unsuccessful, storing the signal message from the third message, and repeating the step of transmitting the second message.

4. The method as claimed in claim 1, wherein the random access is operated for a stand-alone NR cell of the unlicensed frequency band.

5. The method as claimed in claim 1, wherein the random access is operated for carrier aggregation between a New Radio (NR) cell of a licensed frequency band as a primary cell and an NR cell of the unlicensed frequency band as a secondary cell;
   the random access is operated for dual connectivity between a Long Term Evolution (LTE) cell of a licensed frequency band as a primary cell and an NR cell of the unlicensed frequency band as a secondary cell;
   the random access is operated for an NR cell with a downlink in the unlicensed frequency band and an uplink in a licensed frequency band; or
   the random access is operated for dual connectivity between an NR cell of a licensed frequency band as a primary cell and an NR cell of the unlicensed frequency band as a secondary cell.

6. A UE, comprising:
   a processor, a communication circuit and a storage, the processor connected to the communication circuit and the storage, wherein the storage stores program instructions, and the processor executes the program instructions to implement a random access method for communication with a base station through the communication circuit, comprising:
transmitting a first message to the base station, the first message including a preamble message and a signal message;
receiving a second message and a fourth message from the base station at a time and determining random access for the UE is successful upon receiving the second message and the fourth message; and
upon reception of a second message configured to request the UE to transmit the signal message, transmitting a third message comprising the signal message, receiving the fourth message in response to the third message, and determining random access for the UE is successful upon receiving the fourth message;
wherein the base station and the UE operate in an unlicensed frequency band;
the second message comprises at least one of a time adjustment information, a cell radio network temporary identity, and an uplink resource allocation; and
the fourth message comprises a contention resolution.

7. The UE as claimed in claim 6, wherein the random access is a random access according to New Radio in Unlicensed Spectrum (NR-U).

8. The UE as claimed in claim 6, wherein
before implementing the random access method, the processor incorporates with the communication circuit to implement a Listen Before Talk LBT mechanism to determine whether a current communication environment is suitable for random access communication.

9. The UE as claimed in claim 6, wherein:
the UE waits for the fourth message notifying that random access for the UE is successful after transmission of the first message;
and if the fourth message is not received within a preset waiting time after transmission of the first message, retransmitting the first message.

10. The UE as claimed in claim 6, wherein the random access is operated for a stand-alone NR cell of the unlicensed frequency band.

11. The UE as claimed in claim 6, wherein the random access is operated for carrier aggregation between a New Radio (NR) cell of a licensed band as a primary cell and an NR cell of the unlicensed frequency band as a secondary cell;
the random access is operated for dual connectivity between a Long Term Evolution (LTE) cell of a licensed frequency band as a primary cell and an NR cell of the unlicensed frequency band as a secondary cell;
the random access is operated for an NR cell with a downlink in the unlicensed frequency band and an uplink in a licensed frequency band; or
the random access is operated for dual connectivity between an NR cell of a licensed frequency band as a primary cell and an NR cell of the unlicensed frequency band as a secondary cell.

12. A base station, comprising:
a processor, a communication circuit, and a storage, wherein the processor is connected to the communication circuit and the storage, the storage stores program instructions, and the processor executes the program instructions to implement a random access method for communication with a UE through the communication circuit comprising:
receiving a first message transmitted from the UE, wherein the first message includes a preamble message and a signal message;
decoding the first message comprising the preamble message and the signal message transmitted from the UE;
transmitting, upon successfully decoding the first message, a second message and a fourth message at a time to the UE to notify the UE that random access for the UE is successful;
when the preamble message is successfully decoded while decoding of the signal message is failed, the base station storing the signal message, and transmitting the second message configured to request the UE to transmit a third message comprising the signal message;
upon reception of the third message transmitted in response to the second message, the base station decoding the signal message from the third message in conjunction with the stored signal message based on a chase combine mechanism; and
when decoding of the preamble message and the signal message are both successful, transmitting the fourth message configured to notify the UE that random access for the UE is successful;
wherein the base station and the UE operate in an unlicensed frequency band;
the second message comprises at least one of a time adjustment information, a cell radio network temporary identity, and an uplink resource allocation; and
the fourth message comprises a contention resolution.

13. A device with a storage function, stored with program instructions, the program instructions configured to be executed to implement a random access method for communication between a base station and a UE, the random access method comprising:
receiving a first message transmitted from the UE, wherein the first message includes a preamble message and a signal message;
decoding the first message comprising the preamble message and the signal message transmitted from the UE;
transmitting, upon successfully decoding the first message, a second message and a fourth message at a time to the UE to notify the UE that random access for the UE is successful;
when the preamble message is successfully decoded while decoding of the signal message is failed, the base station storing the signal message, and transmitting the second message configured to request the UE to transmit a third message comprising the signal message;
upon reception of the third message transmitted in response to the second message, the base station decoding the signal message from the third message in conjunction with the stored signal message based on a chase combine mechanism; and
when decoding of the preamble message and the signal message are both successful, transmitting the fourth message configured to notify the UE that random access for the UE is successful;
wherein the base station and the UE operate in an unlicensed frequency band;
the second message comprises at least one of a time adjustment information, a cell radio network temporary identity, and an uplink resource allocation; and
the fourth message comprises a contention resolution.

14. The device with a storage function as claimed in claim 13, wherein the random access is operated for carrier aggregation between a New Radio (NR) cell of a licensed frequency band as a primary cell and an NR cell of the unlicensed frequency band as a secondary cell;

the random access is operated for dual connectivity between a Long Term Evolution (LTE) cell of a licensed frequency band as a primary cell and an NR cell of the unlicensed frequency band as a secondary cell;

the random access is operated for a stand-alone NR cell of the unlicensed frequency band;

the random access is operated for an NR cell with a downlink in the unlicensed frequency band and an uplink in a licensed frequency band; or the random access is operated for dual connectivity between an NR cell of a licensed frequency band as a primary cell and an NR cell of the unlicensed frequency band as a secondary cell.

15. The base station as claimed in claim 12, wherein the random access is a random access according to New Radio in Unlicensed Spectrum (NR-U).

16. The base station as claimed in claim 12, wherein:

when decoding of the signal message from the third message is unsuccessful, the processor incorporates with the communication circuit and the storage to store the signal message from the third message, and repeats the step of transmitting the second message.

17. The base station as claimed in claim 12, wherein the random access is operated for a stand-alone NR cell of the unlicensed frequency band.

18. The base station as claimed in claim 12, wherein the random access is operated for carrier aggregation between a New Radio (NR) cell of a licensed frequency band as a primary cell and an NR cell of the unlicensed frequency band as a secondary cell;

the random access is operated for dual connectivity between a Long Term Evolution (LTE) cell of a licensed frequency band as a primary cell and an NR cell of the unlicensed frequency band as a secondary cell;

the random access is operated for an NR cell with a downlink in the unlicensed frequency band and an uplink in a licensed frequency band; or the random access is operated for dual connectivity between an NR cell of a licensed frequency band as a primary cell and an NR cell of the unlicensed frequency band as a secondary cell.

\* \* \* \* \*